5942X
E. L. Hommedieu.
Rolling Die.
Patented Apr. 28, 1830.
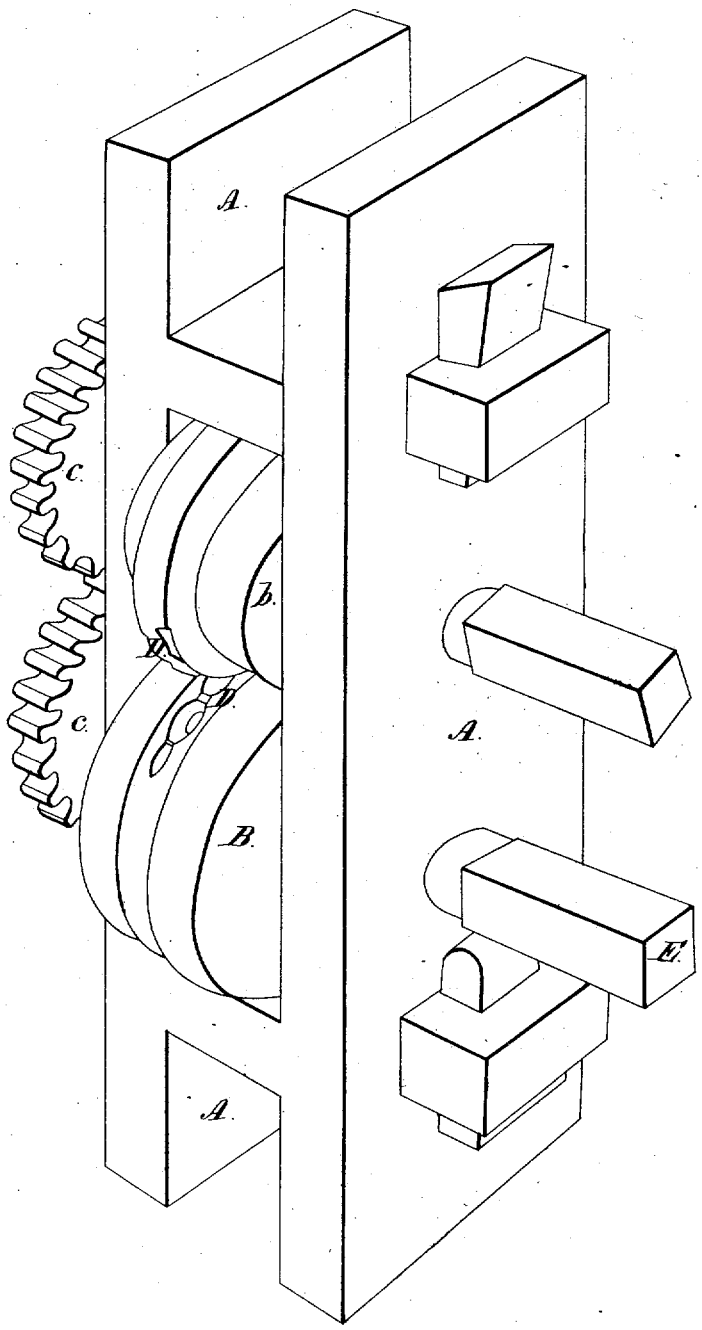
THE GRAPHIC CO. PHOTO-LITH. 39 & 41 PARK PLACE, N.Y.

Ezra L'Hommedieu
Letters Patent.

The Schedule referred to in these Letters Patent and making part of the same containing a description in the words of the said Ezra L'Hommedieu himself of his improvement in the machine for shaping Hammers Spike Gimblets and Pod augers.

The machine of which I claim the invention is constructed of Iron in the following manner (Viz) The frame or clamps consist of four rectangular pieces of cast iron of about two inches in thickness by eight inches wide, and the sides or upright pieces are about three feet long with mortices near their ends to receive the tenons of the cross pieces. which are about four inches long between joints. the frames should be firmly keyed together leaving the inside quadrangular about six by twenty four inches in the clear. In this frame is placed two cast iron Rolls about four inches thick and about eleven inches diameter. with necks or bearings extending through the side pieces in which they turn. three of these necks are three inches . diameter, and two of them extend without the frame about four inches to receive spur wheels by which the leading roll is turned by the driving roll. One neck upon the lower roll opposite the cog wheel side should be about four inches in diameter and made to receive a socket or coupling box to couple it to the driving shaft by which it may be put in motion. Upon the eyes or periphery of the lower or driving roll is made a groove about half an inch deep. in which is inserted a proper die to shape one side of the hammer. Gimblet or Auger as may be wanted, and upon the edge of the other roll is raised a tongue or list projecting about half an inch in which is inserted a proper die to shape the other side of the implement wanted or required. These rolls must be of one diameter at their rolling or working parts and the tongue of one must fit the groove of the other. and the spur wheels by which they are connected must be of one pattern or diameter, that they may move together without slipping. This machine may be put in motion by any adequate power being applied to the driving shaft. which is coupled to the driving roll. and the dies must

[illegible] X5942 beds placed in the rolls as to roll opposite or against each other which will
shape a piece of hot iron or steel [illegible] [illegible] [illegible] them into the
form desired. By this machine much time and labour may be saved
in shaping the above mentioned articles N.B. I claim that the
application of the above described machine to shaping the articles afore
said is my discovery and for which I shall claim Letters Patent.
For a further illustration of the machine I refer to the drawing accom
panying this Specification. In testimony whereof I have hereunto
set my hand and seal this 21st day of January A.D. 1830.

Exd. Witnesses
Wyl. Samuel Hough Ezra L'Hommedieu
Phebe Clark (5744 [illegible])

(Patented April 28 1830)